(12) United States Patent
Kiest, Jr.

(10) Patent No.: US 10,065,359 B2
(45) Date of Patent: *Sep. 4, 2018

(54) APPARATUS AND METHOD FOR LINING A PIPE

(71) Applicant: LMK Technologies LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/646,352

(22) Filed: Jul. 11, 2017

(65) Prior Publication Data

US 2017/0305064 A1    Oct. 26, 2017

Related U.S. Application Data

(63) Continuation of application No. 12/472,748, filed on May 27, 2009, now Pat. No. 9,724,872.

(51) Int. Cl.
*B29C 63/36* (2006.01)
*F16L 55/1645* (2006.01)
*F16L 55/165* (2006.01)

(52) U.S. Cl.
CPC .......... *B29C 63/36* (2013.01); *F16L 55/1645* (2013.01); *F16L 55/1651* (2013.01)

(58) Field of Classification Search
CPC ..................................................... B29C 63/36
See application file for complete search history.

(56) References Cited

U.S. PATENT DOCUMENTS

| 4,064,211 | A |   | 12/1977 | Wood |
|---|---|---|---|---|
| 4,245,970 | A |   | 1/1981 | St. Onge |
| 4,252,763 | A |   | 2/1981 | Padgett |
| 4,401,696 | A | * | 8/1983 | Wood .................. F16L 55/1651 156/242 |
| 4,456,401 | A |   | 6/1984 | Williams |
| 4,602,974 | A | * | 7/1986 | Wood ..................... B29C 63/36 118/408 |

(Continued)

FOREIGN PATENT DOCUMENTS

| DE | 3801471 A1 | 8/1986 |
|---|---|---|
| WO | 2006128256 | 12/2006 |

OTHER PUBLICATIONS

International Search Report, LMK Enterprises, Inc., PCT/US2010/036045 dated Jul. 21, 2010, 3 pages.

(Continued)

*Primary Examiner* — Ryan M Ochylski
(74) *Attorney, Agent, or Firm* — Nyemaster Goode, PC (57) ABSTRACT

An apparatus and a method for forming a lining in a pipe is disclosed. A pumpable material capable of curing is dispensed about an interior wall of a damaged section of pipe between an inflatable bladder and the pipe. The pumpable material is compressed between the bladder and the pipe and allowed to cure. An assembly for forming the lining in the pipe includes a feeding pump, a static mixer, a dispensing unit and a bladder. The pumpable material is preferably dispensed rearward of an inverting face of the bladder and the dispensing unit and the bladder move substantially in sync along the interior of the pipe.

20 Claims, 7 Drawing Sheets

(56) References Cited

U.S. PATENT DOCUMENTS

| | | | |
|---|---|---|---|
| 5,405,218 | A | 4/1995 | Hyde-Smith |
| 5,409,561 | A | 4/1995 | Wood |
| 5,549,856 | A | 8/1996 | Yokoshima |
| 5,656,117 | A | 8/1997 | Wood |
| 5,762,450 | A | 6/1998 | Schmager |
| 6,050,300 | A | 4/2000 | Schwert et al. |
| 6,161,588 | A | 12/2000 | Bellamy et al. |
| 6,180,169 | B1 | 1/2001 | Nichols |
| 6,427,726 | B1 | 8/2002 | Kiest, Jr. |
| 6,478,054 | B1 | 11/2002 | Kiest |
| 6,986,813 | B2 | 1/2006 | Davis |
| 7,025,580 | B2 | 4/2006 | Heagy et al. |
| 7,338,687 | B2 | 3/2008 | Davis |
| 7,857,932 | B1 | 12/2010 | Driver et al. |
| 9,724,872 | B2 * | 8/2017 | Kiest, Jr. ................. B29C 63/36 |
| 2008/0277838 | A1 | 11/2008 | Hassen et al. |

OTHER PUBLICATIONS

International Search Report, ShieldLiner Limited, PCT/AU2006/000764 dated Aug. 24, 2006, 3 pages.

* cited by examiner

APPARATUS AND METHOD FOR LINING A PIPE

This application is a Continuation Application of U.S. patent application Ser. No. 12/472,748 filed May 27, 2009, which is herein incorporated by reference in its entirety.

BACKGROUND OF THE INVENTION

The present invention relates to an apparatus and method for lining an interior surface of a pipeline.

A method presently used for repairing pipelines includes the use of a liner tube having a felt layer on its inside and having a protective layer made of polymer or other plastic material on its outside. The liner tube is vacuum-impregnated with a resin mix in what is commonly referred to as a "wet-out" process. Just prior to wetting-out the liner, a catalyst is mixed with the resin so as to activate the resin and cause it to begin curing and hardening. The resin impregnated liner tube is then inverted into the pipeline so that the felt layer is inverted from the inside of the tube to the outside. Once the resin cures and hardens, the liner provides a new lining for the pipeline. Some resins are set to cure at ambient temperatures. In some instances, steam or hot water is applied inside the lining tube to speed the cure time One problem with the present method is that the catalyst must be mixed with the resin before the liner tube is wet-out and before positioning the liner tube at the damaged section of pipe. Once the catalyst is applied to the resin, the resin begins curing and time is of the essence in order to have the liner tube in place within the pipeline to be repaired. If the resin hardens before the liner tube is properly positioned within the pipe, it may require that a portion of the existing pipeline be dug up and replaced. If, on the other hand, a resin mix with a longer cure time is used to ensure adequate working time to install the liner, productivity suffers as the crew waits for the liner to cure and harden.

Aside from the loss in productivity, there are also additional costs involved in retarding or accelerating the cure time. For example, following the wet-out process the lining tube can be packed in ice and stored in a refrigerated compartment of the truck to retard or prevent the resin from curing. To accelerate the cure time, a large boiler and other equipment is required at the job site. Such equipment and the associated labor required all adds to the total installation cost.

Some attempts have been made to spray or sling grout onto the interior surface of the pipe. Such methods are also problematic. Spraying or slinging grout inside the pipe does not provide for a uniform wall thickness of the lining. The grout or other material applied will also tend to run away from the crown of the pipe and toward the bottom of the pipe before the material can cure and harden. This sagging effect results in the uneven distribution of lining material around the interior of the pipe. The lining also does not have a smooth surface. Still further yet, the spraying or slinging method is not effective in areas of the pipe where there is ground water infiltration. Problems still certainly remain.

Use of a pre-formed liner tube itself can be problematic. For example, the liner tube is normally fabricated off-site in a factory and thus the dimensions of the host pipe and the section of pipe in need of repair must be known in advance to construct a liner of appropriate size. Conventional liners are also susceptible to shrinkage and other structural problems.

Therefore, a primary object, feature and/or advantage of the present invention is the provision of an improved method for forming a liner in a pipeline.

A further object, feature and/or advantage of the present invention is a new apparatus and method for lining a pipe that does not require a pre-formed liner tube.

A further object, feature and/or advantage of the present invention is the provision of a new method that provides a pipe lining having a smooth surface with a uniform wall thickness.

A still further object, feature and/or advantage of the present invention is the provision of the new lining system that is unaffected by ground water and other materials in the host pipe.

A further object, feature and/or advantage of the present invention is a new lining method that allows for extremely fast cure times to greatly improve productivity.

Yet a further object, feature and/or advantage of the present invention is the provision of a new method of pipe line repair that is flexible in allowing any length of lining to be installed during the installation process without pre-fabrication of a liner of a desired length.

A still further object, feature and/or advantage of the present invention is the provision of a new method and means for lining that is more cost-effective than prior art methods.

These and/or other objects, features and/or advantages of the invention will become apparent with reference to the remainder of the specification and claims.

BRIEF SUMMARY OF THE INVENTION

One aspect of the invention includes a method of rehabilitating a damaged section of pipe that obviates the need for a pre-formed liner. The method generally includes dispensing a pumpable material capable of curing about an interior wall of the damaged section of pipe between a bladder and the pipe, compressing the bladder against the damaged section of pipe with the pumpable material disposed between the bladder and the pipe, and allowing the pumpable material to cure.

In a preferred form, the bladder is inverted in the pipe and the pumpable material is dispensed rearward of an inverting face of the bladder using a dispensing unit. The pumpable material, such as a resin mix including a resin and a catalyst, is dispensed evenly about the interior wall of the damaged section of pipe. Dispensing the pumpable material rearward of the inverting face of the bladder as the bladder inverts along the pipe prevents the pumpable material from sagging to the bottom of the pipe and provides a lining having a uniform wall thickness with a smooth interior surface. The inverting face of the bladder is substantially in sync with the dispensing unit to ensure that the pumpable material is dispensed rearward of the inverting face of the bladder.

In one exemplary embodiment of the invention, the bladder is removed from the damaged section of pipe once the pumpable material fully cures. A non-stick bladder facilitates easy removal of the bladder as it is re-inverted from host pipe, pulling away from the new pipe lining.

In an alternative embodiment, the bladder remains in the pipe, becoming part of the lining. Here, it is preferable that the exterior surface of the bladder once inverted is uneven and includes projections adapted to mechanically bond the pumpable material to the bladder after the pumpable material cures, thus creating both an adhesive bond and a mechanical bond to hold the bladder in place.

Another aspect of the invention includes an assembly for lining an interior of a pipe that includes a feeding pump, a static mixer in fluid communication with the feeding pump for mixing a pumpable material capable of curing, such as a resin and a catalyst to form a resin mix. A dispensing unit is in fluid communication with the outlet of the static mixer. The dispensing unit includes a nozzle adapted to dispense the pumpable material evenly around the interior of the pipe. The bladder is adapted to compress the pumpable material against the interior of the pipe. The dispensing unit is operatively connected to a first reel and first motor and the bladder is operatively connected to a second reel and second motor and wherein the first and second reels are electronically controlled in order to control the rate at which the bladder and the dispensing unit move along the interior of the pipe. The dispensing unit preferably includes a flexible end portion adapted to move around irregular surfaces or projections on the interior of the host pipe.

The present invention contemplates repair of all kinds of pipelines including, but not limited to, mainline sewer pipelines, lateral sewer pipelines, gas pipelines and water pipelines.

DETAILED DESCRIPTION OF THE PREFERRED EMBODIMENT

Figure 1A:
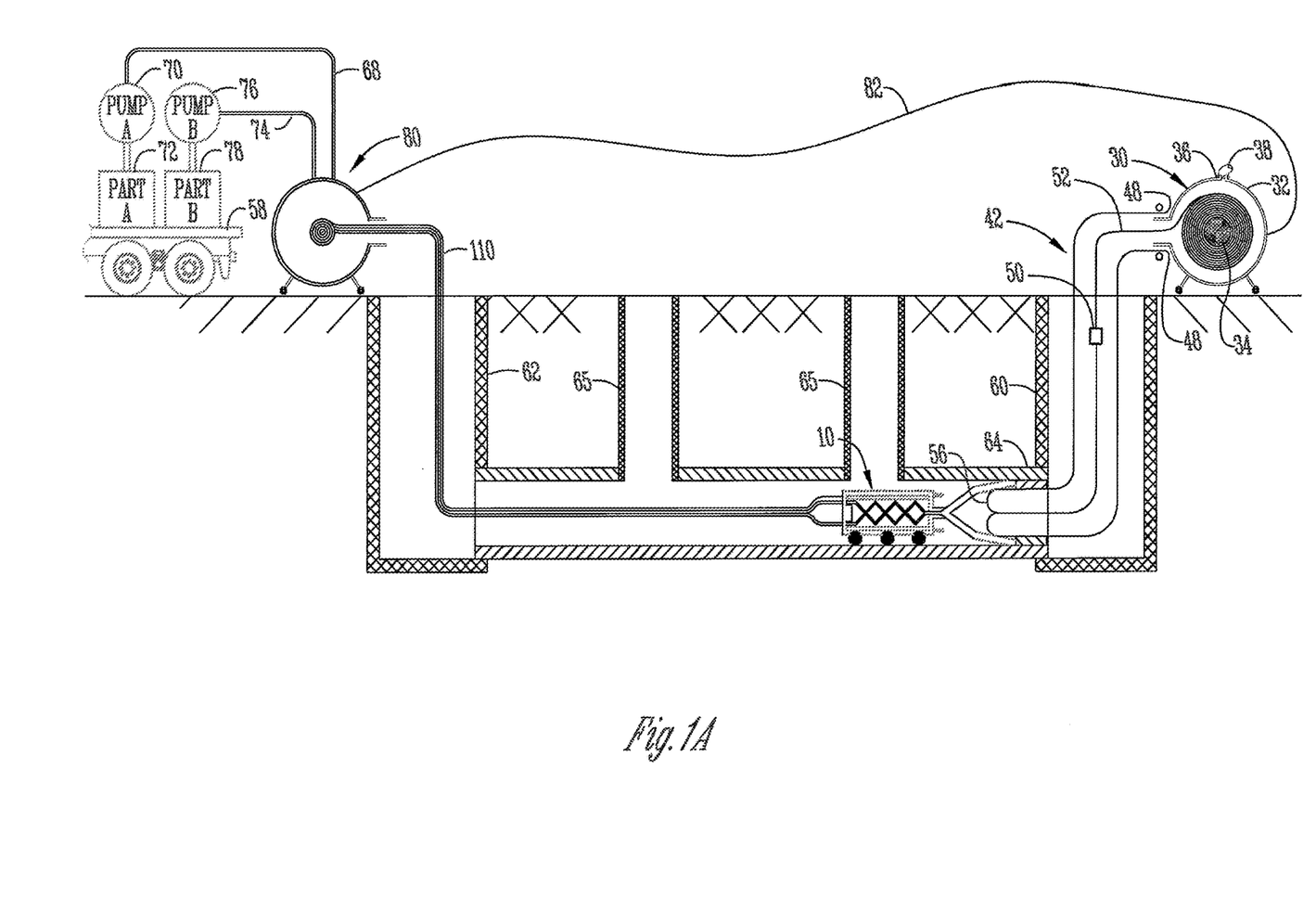
FIG. 1A is a schematic view illustrating a preferred embodiment of the present invention utilized for repairing a mainline pipe extending between two manholes.

Referring to FIG. 1A, a main pipeline 64 is shown extending between a downstream manhole 62 and an upstream manhole 60. While the present invention is shown for use with sewer pipeline repair, the present invention can be utilized for repairing other types of pipe, such as gas, water, oil, steam and compressed air pipe.

Adjacent the downstream manhole 62 is a truck 58 having resin pump A 70 and a reservoir A 72 and catalyst pump B 76 and a reservoir B 78 mounted thereon. Hose 68 and hose 74 extend from the reservoirs A 72 and B 78, respectively, down to a static mixer 28 housed within a small tractor 10 shown within the pipeline 64. The hoses 68 and 74 may also include electronic cables for controlling the tractor 10.

Figure 2A:
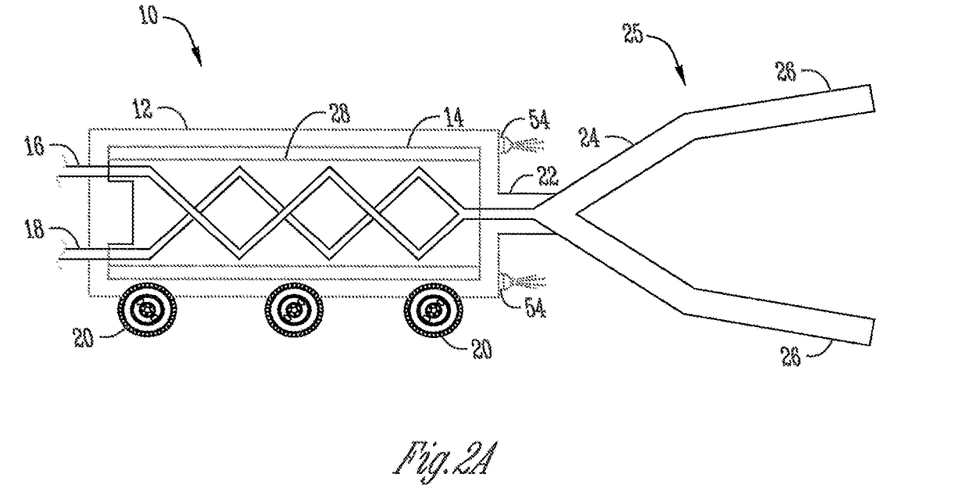
FIG. 2A is an enlarged side view of a tractor and resin dispensing unit with nozzle for use in a preferred embodiment of the present invention.
Figure 2B:
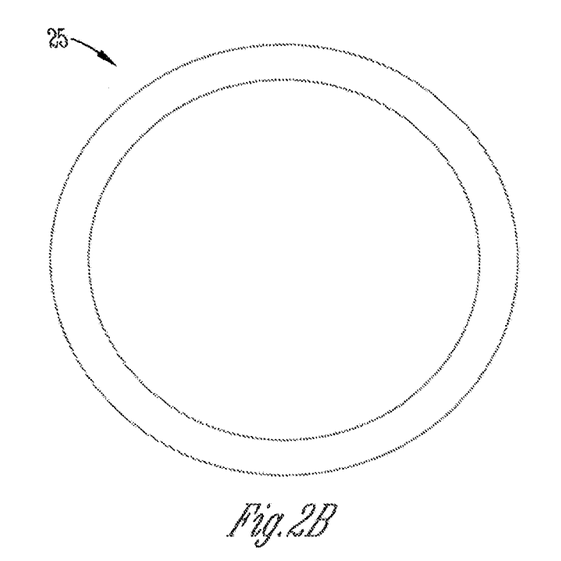
FIG. 2B is an end view of the nozzle of the dispensing unit.

FIG. 2A shows the tractor 10 and dispensing unit 25 extending therefrom. Tractors such as the one shown are commonly used in the pipeline repair industry and are capable of moving along the length of the pipeline 64. The tractor 10 shown includes a tractor housing 12, wheels 20 and cameras 54. The static mixer 28, disposed within a static mixer housing 14, is positioned within the tractor housing 12. The dispensing unit 25 comprises a nozzle which is fluidly connected to an output 22 from the static mixer 26 for applying a resin mixture on the interior of the pipeline 64. The nozzle of the dispensing unit 25 includes a rigid section 24 and a flexible end portion 26. The flexible end portion 26 is formed of a material like rubber and, if necessary, can be removed and replaced after each application. As shown in FIGS. 2A and 2B, the nozzle of the dispensing unit 25 is formed with funnel-shaped members offset from one another leaving a space therebetween for even distribution of the resin mixture around the periphery of the nozzle.

A two-part resin including a resin with a catalyst is an example of a pumpable material capable of curing that is suitable for use with the present invention. The preferred resin mixture is an epoxy resin set at a 1:1 resin to catalyst mix ratio, Rhino Linings product no. 1310T. Rhino Linings is located at 9090 Kenemar Drive, San Diego, Calif. USA 92121. A single component resin, such as a UV cured resin, could also be used. Other pumpable materials for use with the invention include motor, grout, and modified liquid materials capable of hardening and producing high flexural and tensile properties. Modifiers include nanocarbon tubes and similar structural enhanced additives.

The preferred two-part resin is pumped from pump A 70 and pump B 76 to inputs 16 and 18 of the static mixer 28. The resin is fed via hose 68 to input 16 and the catalyst is fed via hose 74 to input 18 and completely mixed within the static mixer 28. The resulting mixture is distributed from output 22 of the static mixer 28 and through the dispensing unit onto the interior surface of the pipeline 64. The flexible end portion 26 of the nozzle of the dispensing unit 25 is preferably biased radially outwardly so as to maintain contact with the interior wall of the pipeline 64.

Static mixers incorporate a series of geometric mixing elements that are made from metal or a variety of plastics fixed within a cylindrical (tube) or squared housing, which use the energy of the flow stream to create mixing between two or more fluids. Likewise, the mixer housing can be made from metal or plastic. Typical materials of construction for the static mixer components include clear PVC, gray PVC, stainless steel, ductile iron, polypropylene, Teflon, Kynar, fiberglass and polyacetal.

Hoses 68 and 74 are wound through a take-up reel 80 outside and above the downstream manhole 62. The hoses 68 and 74 are banded as designated by the reference numeral 110. In addition to acting as a conduit for the pumpable material, the banded hoses 110 also help to properly position and move the dispensing unit 25 along the pipeline 64. The take-up reel 80 controls the length the banded hoses 110.

Outside and above the upstream manhole 60 is a pressurized reel 30 which contains an outer cylindrical housing 32 and a center roller 34. A pressure inlet valve 36 in the housing 32 provides communication from the interior of the housing to a pressure hose 38. Pressure hose 38 is preferably connected to a pneumatic source of pressurized air. However, other fluids could be used without detracting from the invention.

Figure 4:
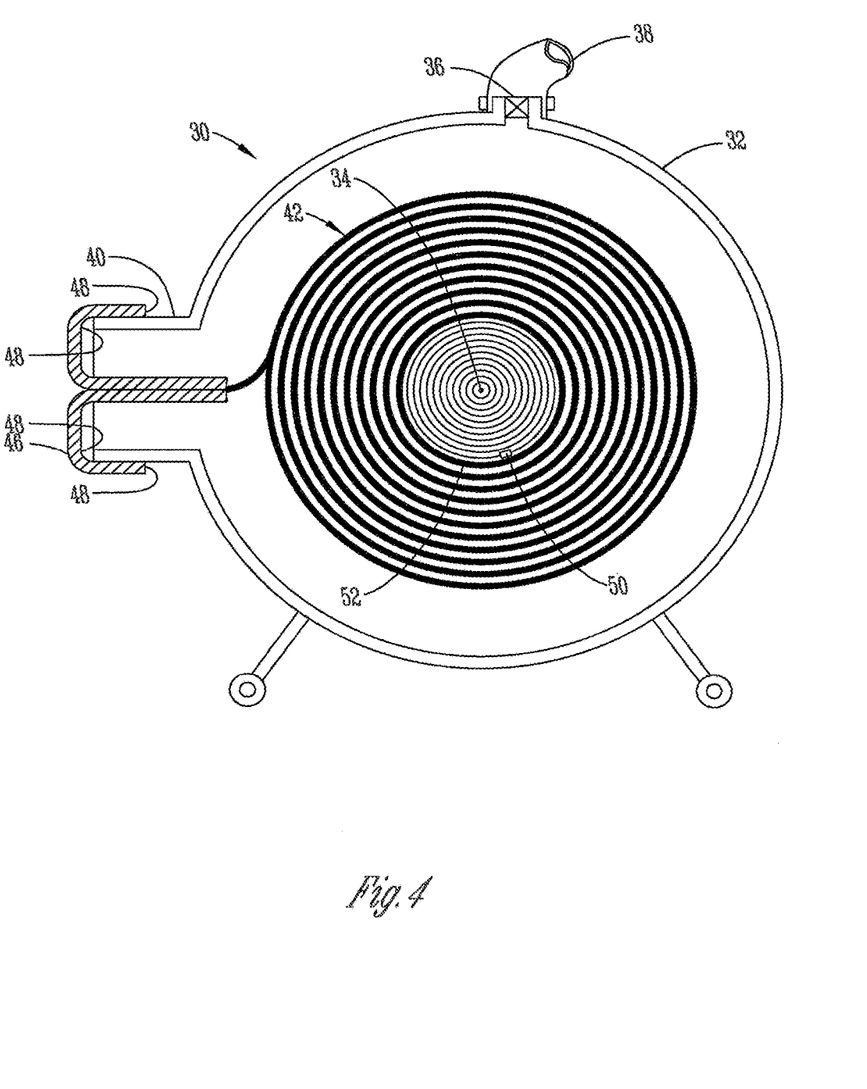
FIG. 4 is an enlarged sectional view of a pressurized reel with bladder loaded therein for use in a preferred embodiment of the present invention.

The pressurized reel is shown in greater detail in FIG. 4. The valve 36 is movable from an open position permitting pressurized fluid (preferably air) to be introduced to the interior of pressurized reel 30 to a closed position shutting off communication of pressurized fluid from the interior of the pressurized reel 30. The reel 30 includes an inverting boss 40 on one of its sides upon which may be mounted an inflatable bladder tube designated generally by the numeral 42.

The bladder tube 42 is preferably formed from a fiber reinforced non-stick plastic material, which allows the bladder tube 42 to be easily removed from the cured lining material when re-inverted through the pipeline 64. The bladder tube 42 preferably includes a body formed of a layer of fiber reinforcing material, such as a scrim reinforcing fabric. The layer of fiber reinforcing material is preferably a scrim of Nylon filament knit fibers. The body has an inside coating and an outside coating, both preferably made of a thermoplastic elastomer. An example of a commercial TPE elastomer alloy found suitable is Santopreene® from Monsanto. The wall thickness of the bladder is preferably 15-30 mils.

Referring again to FIG. 4, a rope 52 is wound around the center roller 34 within the pressurized reel 30. Sufficient rope must be included to go the entire length of the damaged portion of the pipeline 64 to be repaired. The closed end 50 of the bladder tube 42 is attached to the end of the rope 52. The bladder tube 42 is then wound around the center roller 34 until its complete length is taken up. The open end 48 of the bladder tube 42 is fitted over the boss 40 and is taped or clamped in place so as to have an airtight connection therearound. As shown in FIG. 4, the open end 48 of the bladder tube 42 is folded back upon itself much in the same fashion as the peeling off of a sock.

In operation, the bladder tube 42 must be properly positioned initially relative to the dispensing unit 25. A length of the bladder tube 42 is dropped into the upstream manhole 60 adjacent the opening to the main pipeline 64. An operator in the manhole 60 can then position the inverting face 56 of the bladder tube 42 inside the nozzle of the dispensing unit 25. The inverting face 56 of the bladder tube 42 should extend into the nozzle past the end portion 26 where the resin mix is dispensed. The valve 36 is then moved to its open position and fluid pressure, preferably air, as introduced into the interior of the reel 30 such that the bladder tube 42 inflates and the pull rope 52 becomes taut. Similarly, the banded hose lines 110 running to the tractor 10 are also pulled taut by the take up reel 80. The resin and catalyst are then pumped from the truck 58 through lines 110 and through the static mixer 28 and out the end portion of the dispensing nozzle 26.

Once an operator visually confirms that the resin mix is dispensing through the end portion 26 of the dispensing unit 25, the reels 80 and 30 are put into a sync mode such that the dispensing unit 25 travels at substantially the same pace and is in synch with the inverting face 56 of the bladder tube 52. The reels 80 and 30 are smart reels that communicate electronically with each other through a data cable 82. Each reel is operatively connected to a motor. The motors are preferably DC motors, and one of the motors may be positioned within the pressurized reel vessel. It is preferable that the rotational speed of the take up reel 80 be slightly less than the rotational speed of the pressurized reel 30, as this avoids the inverting face 56 of the bladder tube 42 and the dispensing unit separating. The force applied by the inverting bladder tube 42 helps push the dispensing unit through the pipeline 64 as the reel 80 takes up the slack in the banded hose lines 110.

FIG. 1A shows a small section of the resin mix applied around the interior of the pipeline 64. The resin is dispensed from the flexible end portion 26 of the dispensing unit 25 rearward of the inverting face 56 of the bladder tube 42. This has several advantages. It avoids simply pushing the resin mix forward along the pipeline 64. Also, it prevents the resin mix from sagging and running toward the bottom of the pipeline 64. Instead, the resin mix is dispensed between the inverted bladder tube 42 and the host pipe 64 with the bladder tube compressing the resin mix against the pipe. This provides for an even distribution of resin mix around the interior wall of the host pipe 64 and a smooth, uniform wall thickness for the lining 66. The combination of the flow rate of the resin mix and the rate at which the dispensing unit travels along the pipe determines the wall thickness, as the present invention essentially extrudes the pipe in the host pipe.

Figure 1B:
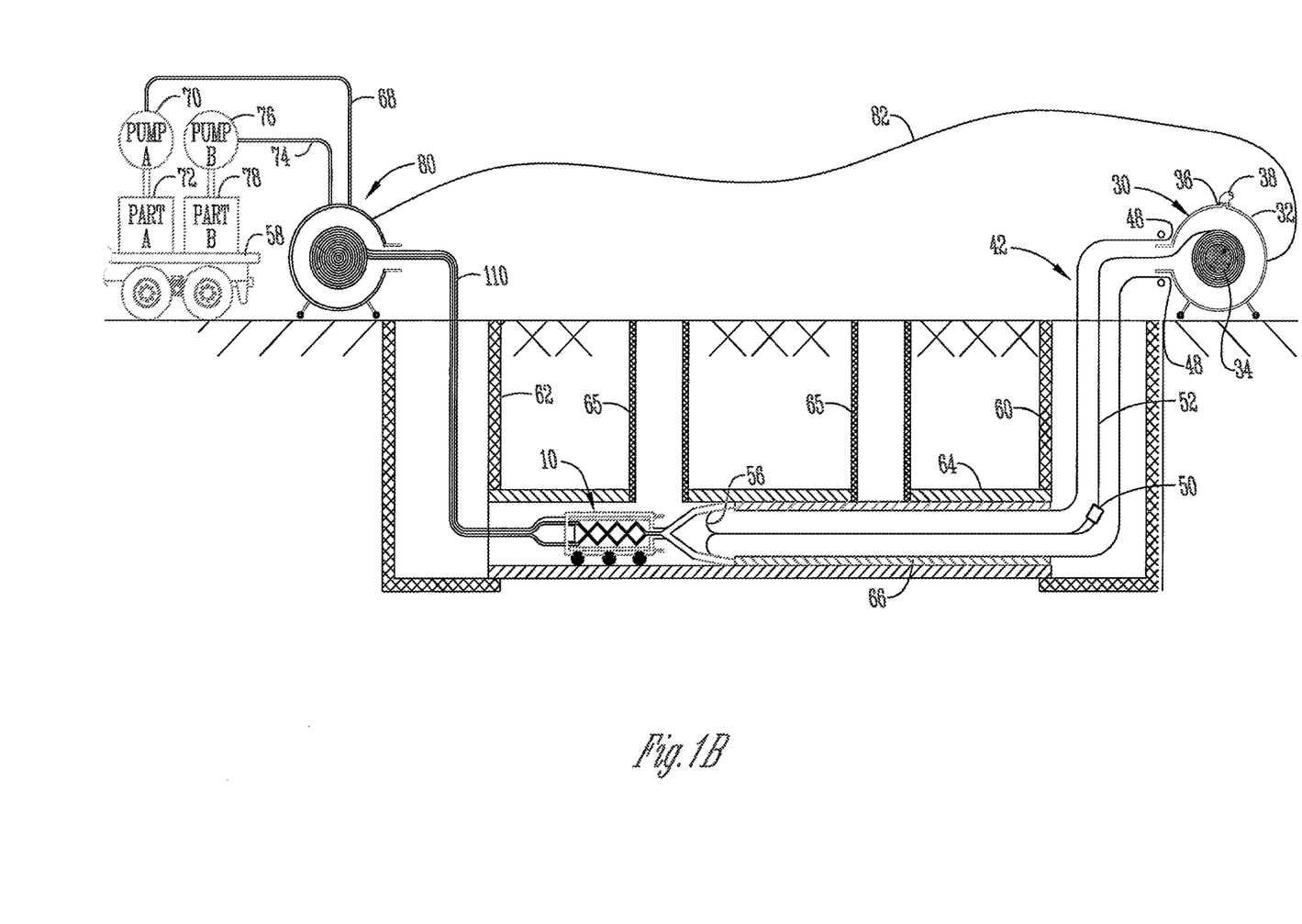
FIG. 1B is a schematic view similar to FIG. 1A, further illustrating the preferred lining process of the present invention.

FIG. 1B shows the dispensing unit and bladder tube after the assembly has moved along a portion of the pipeline 64. The service connections to the lateral pipes 65 must be later reinstated using a robotic cutter or the like. Using a bladder tube 42 having a reinforced scrim, as previously described, limits the expansion of the bladder tube when otherwise unconstrained at the lateral service connections. Once the desired length of lining is applied to the pipe, the bladder tube can stop inverting and pressure within the bladder is maintained until the resin mix fully cures and hardens. Those skilled in the art will appreciate that because of the catalyst is introduced using a static mixer 28 immediately prior to dispensing the resin mix around the interior of the pipe 64, a resin mix having a very short cure time at ambient temperatures can be used, thus greatly improving productivity and cycle time for the operation.

In a preferred form of the invention, the bladder tube 42 is removed after the resin mix has cured and hardened. The bladder tube is removed by pulling the rope 52, which reinverts the bladder tube 42. The easy removal of the bladder tube 42 is facilitated by the use of a non-stick bladder, as previously described.

Figure 5:
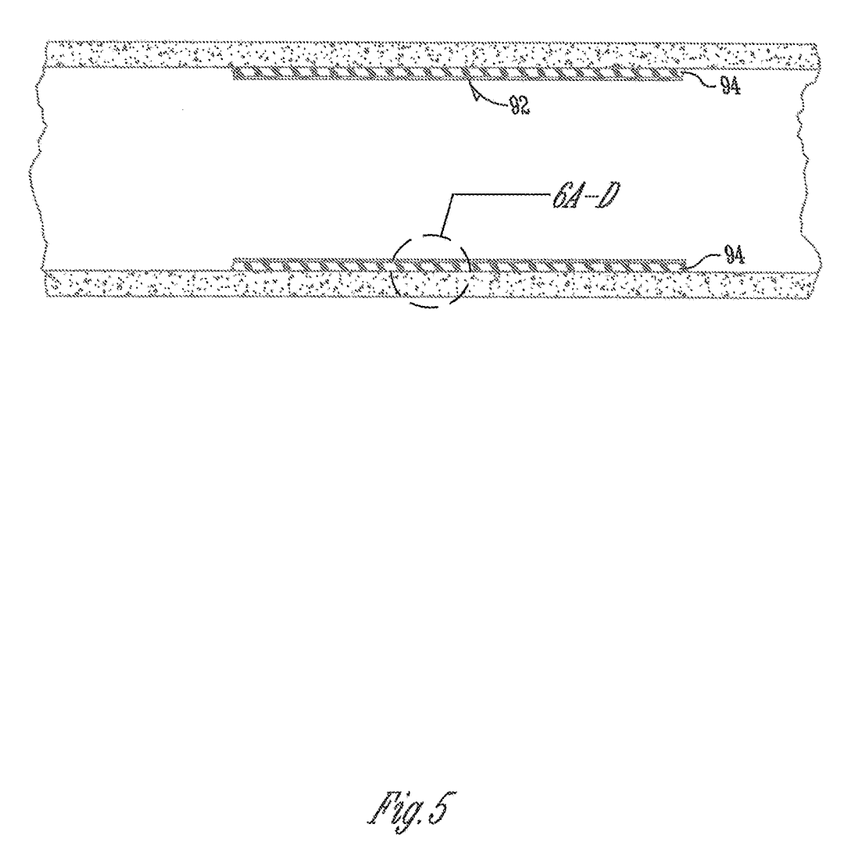
FIG. 5 is a sectional view of a sewer pipe with a damaged section of pipe lined according to a preferred embodiment of the present invention.
Figure 6A:
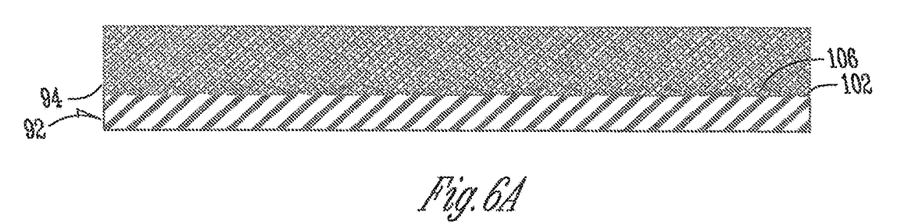
FIGS. 6A-6C are enlarged sectional views, illustrating various forms of a bladder for use in an alternative embodiment of the present invention.
Figure 6B:
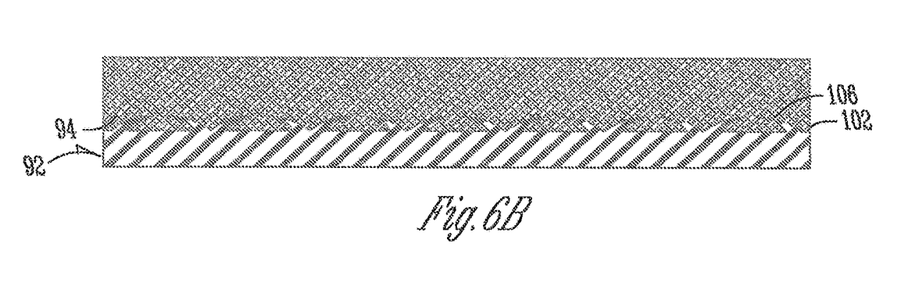
Figure 6C:
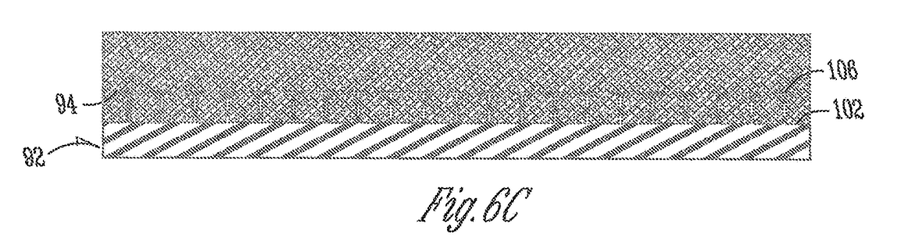

In an alternative embodiment of the preferred lining method, the bladder tube 42 is not removed from the host pipe 64. Instead, the exterior surface 102 of the bladder tube 42 is uneven or irregular in shape, which facilitates a mechanical bond between the cured resin mix and the bladder tube 42. FIG. 5 shows a section of the finished lining with the cured resin mix 94 and bladder 92. The enlarged sectional views 6A-6C show the exterior surface 102 of the bladder tube 42 includes various projections 106 which can be used to physically trap the cured resin. These hook-like projections or protrusions 106 upon trapping the cured resin create a mechanical bond between the resin and the bladder tube 42. Once the resin has set, a closed end portion of the bladder tube can be cut out to reinstate service through the pipe 64. In this embodiment, the bladder becomes an impermeable coating for the lining.

Figure 3:
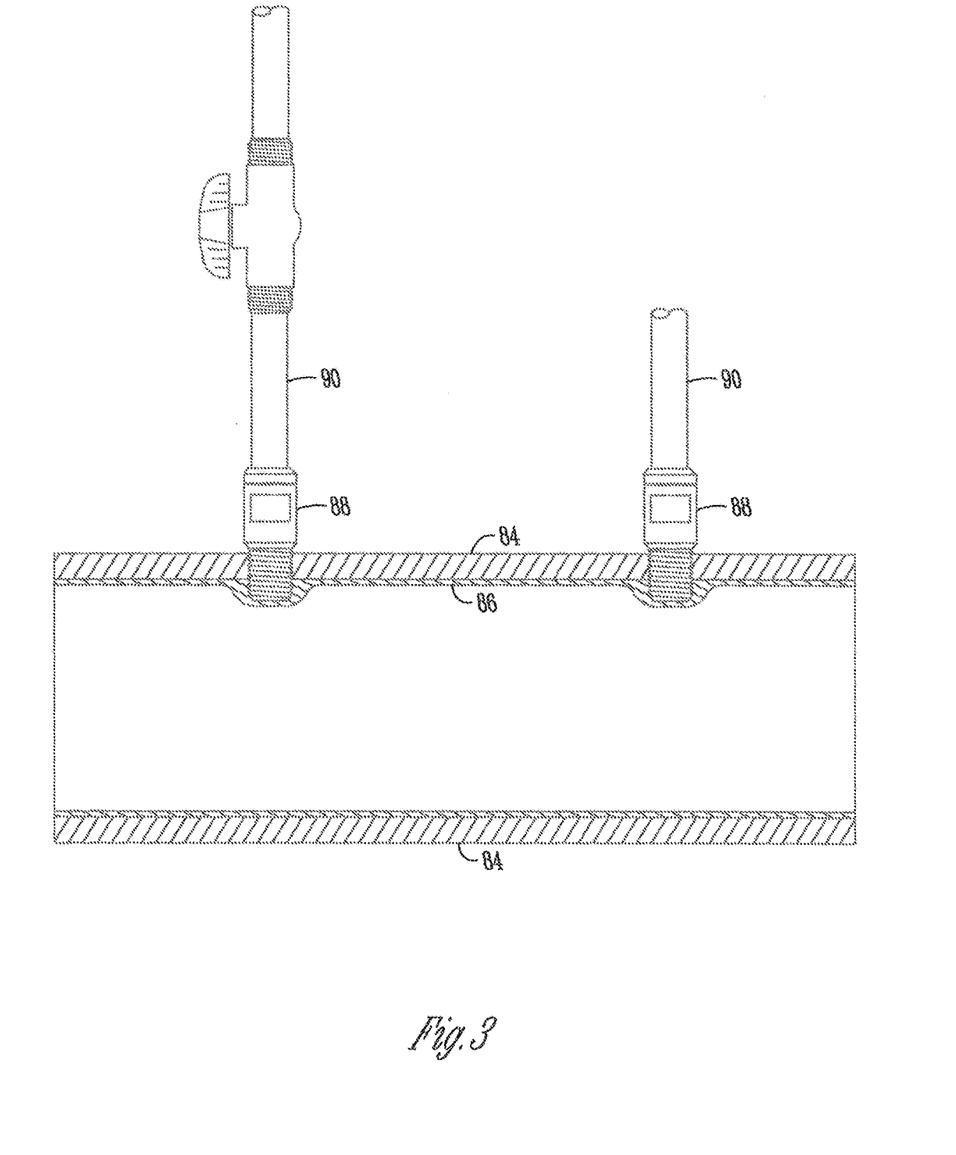
FIG. 3 is a sectional view of a potable water pipe with corporation stops after having been lined according to a preferred embodiment of the present invention.

As described previously, the flexible end portion 26 of the nozzle of the dispensing unit 25 is biased outwardly so as to maintain contact with the interior of the host pipe. Providing a flexible end portion 26 also allows the dispensing unit 25 to accommodate changes in diameter inside the pipe and various protrusions. Consider, for example, a potable water pipe 84, as shown in FIG. 3. Corporation stops 88 connect the service water lines 90 with the potable water pipe 84. The ends of the corporation stops 88 are threaded and protrude into the host pipe 84. The flexible end portions 26 allow the dispensing unit to easily maneuver around the corporation stops 88 to dispense a lining 86.

Those skilled in the art, having the benefit of this disclosure, will appreciate the numerous advantages achieved by the present invention. Of course, no pre-formed liner is required. In addition, the present invention avoids the problems associated with wetting out a liner and either retarding or accelerating the cure rate to accommodate the "working" time. Workers are often constrained by working time. There is limited amount of time to get the liner in place after the resin is mixed. The liner must be wetted out and installed before it cures. Once the liner is properly positioned within the pipe, then it is preferable to speed up the curing process, which may be done by introducing steam, heat, etc. Using the present invention, the wet out process essentially occurs within the pipe and a fast cure time is therefore appropriate. That is, the use of the present invention enables an aggressive cure schedule, which greatly improves productivity. And because a fast cure time can be used with the resin mix in the present invention, the resin mix will quickly become highly viscous, further avoiding the problems associated with sagging at the bottom of the pipe.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

The invention claimed is:

1. A method of rehabilitating a damaged section of pipe that obviates the need for a pre-formed, resin absorbent liner, the method comprising:
   inverting a bladder in the pipe;
   pumping a pumpable material through a dispensing member having a nozzle from ahead of an inverting face of the bladder toward the inverting face of the bladder, wherein the pumpable material is capable of curing and hardening;
   while the bladder is inverting, dispensing the pumpable material from the nozzle rearward of the inverting face of the bladder between an exterior surface of the bladder and the damaged section of pipe and in contact with the pipe;
   compressing the pumpable material disposed between the bladder and the pipe; and
   allowing the pumpable material to cure.

2. The method of claim 1 further comprising removing the bladder from the damaged section of pipe.

3. The method of claim 1 wherein the nozzle comprises a flexible end portion for dispensing the pumpable material, said flexible end portion biased radially outwardly so as to maintain contact with the pipe as the pumpable material is being dispensed.

4. The method of claim 1 wherein the bladder moves substantially in sync with a dispensing unit along the damaged section of pipe as the dispensing unit dispenses the pumpable material.

5. The method of claim 4 where in the bladder is inverted in the pipe and the dispensing unit dispenses the pumpable material continuously behind the inverting face of the bladder.

6. The method of claim 5 wherein the dispensing unit includes a flexible end portion adapted to move around irregular surfaces on the interior of the damaged section of pipe.

7. The method of claim 1 where in the pumpable material is a resin mix comprising a resin and a catalyst.

8. The method of claim 1 wherein the pumpable material is dispensed evenly about the interior wall of the damaged section of pipe.

9. The method of claim 1 where in the pumpable material is a cementitious material.

10. A method of rehabilitating a damaged section of pipe that obviates the need for a pre-formed, resin absorbent liner, the method comprising:
    inverting a bladder in the damaged section of pipe;
    pumping a pumpable material through a dispensing unit, wherein the pumpable material is capable of curing and hardening from ahead of an inverting face of the bladder toward the inverting face of the bladder, wherein the dispensing unit has a dispensing member with a nozzle;
    while the bladder is inverting, dispensing the pumpable material from the nozzle rearward of the inverting face of the bladder between an exterior surface of the bladder and the damaged section of pipe and in contact with the pipe;
    moving the inverting face of the bladder substantially in sync with the dispensing unit along the damaged section of pipe as the dispensing unit dispenses the pumpable material;
    compressing the pumpable material disposed between the bladder and the pipe; and
    allowing the pumpable material to cure.

11. The method of claim 10 where in the pumpable material is a resin mix comprising a resin and a catalyst.

12. The method of claim 10 wherein the pumpable material is dispensed evenly about the interior wall of the damaged section of pipe.

13. The method of claim 10 where in the pumpable material is a cementitious material.

14. The method of claim 10 wherein the nozzle has a rigid section and a flexible end portion.

15. A method of rehabilitating a damaged section of pipe that obviates the need for a pre-formed, resin absorbent liner, the method comprising:
    inverting a bladder in the damaged section of pipe, the bladder having an uneven exterior surface when inverted;
    pumping a pumpable material through a dispensing unit, wherein the pumpable material is capable of curing and hardening from ahead of an inverting face of the bladder toward the inverting face of the bladder, wherein the dispensing unit has a dispensing member with a nozzle having a flexible end portion biased radially outwardly so as to maintain contact with the pipe as the pumpable material is being dispensed;
    while the bladder is inverting, dispensing the pumpable material from the flexible end portion of the nozzle rearward of the inverting face of the bladder between an exterior surface of the bladder and the damaged section of pipe and in contact with the pipe;
    moving the inverting face of the bladder substantially in sync with the dispensing unit along the damaged section of pipe as the dispensing unit dispenses the pumpable material;
    compressing the pumpable material disposed between the bladder and the pipe; and
    allowing the pumpable material to cure.

16. The method of claim 15 wherein the exterior surface of the bladder is adapted to mechanically bond the pumpable material to the bladder after the pumpable material cures.

17. The method of claim 15 where in the exterior surface of the bladder includes projections adapted to mechanically bond the pumpable material to the bladder after the pumpable material cures.

18. The method of claim 15 wherein the exterior surface of the bladder includes hook-like projections adapted to mechanically bond the pumpable material to the bladder after the resin cures and hardens about the exterior surface of the bladder.

19. The method of claim 15 wherein the pumpable material is a resin mix comprising a resin and a catalyst.

20. The method of claim 15 further comprising removing an end portion of the bladder after the pumpable material has cured.

* * * * *